April 20, 1937.　　C. C. BERGEN　　2,077,981
GENERATOR STRUCTURE
Filed Aug. 26, 1935
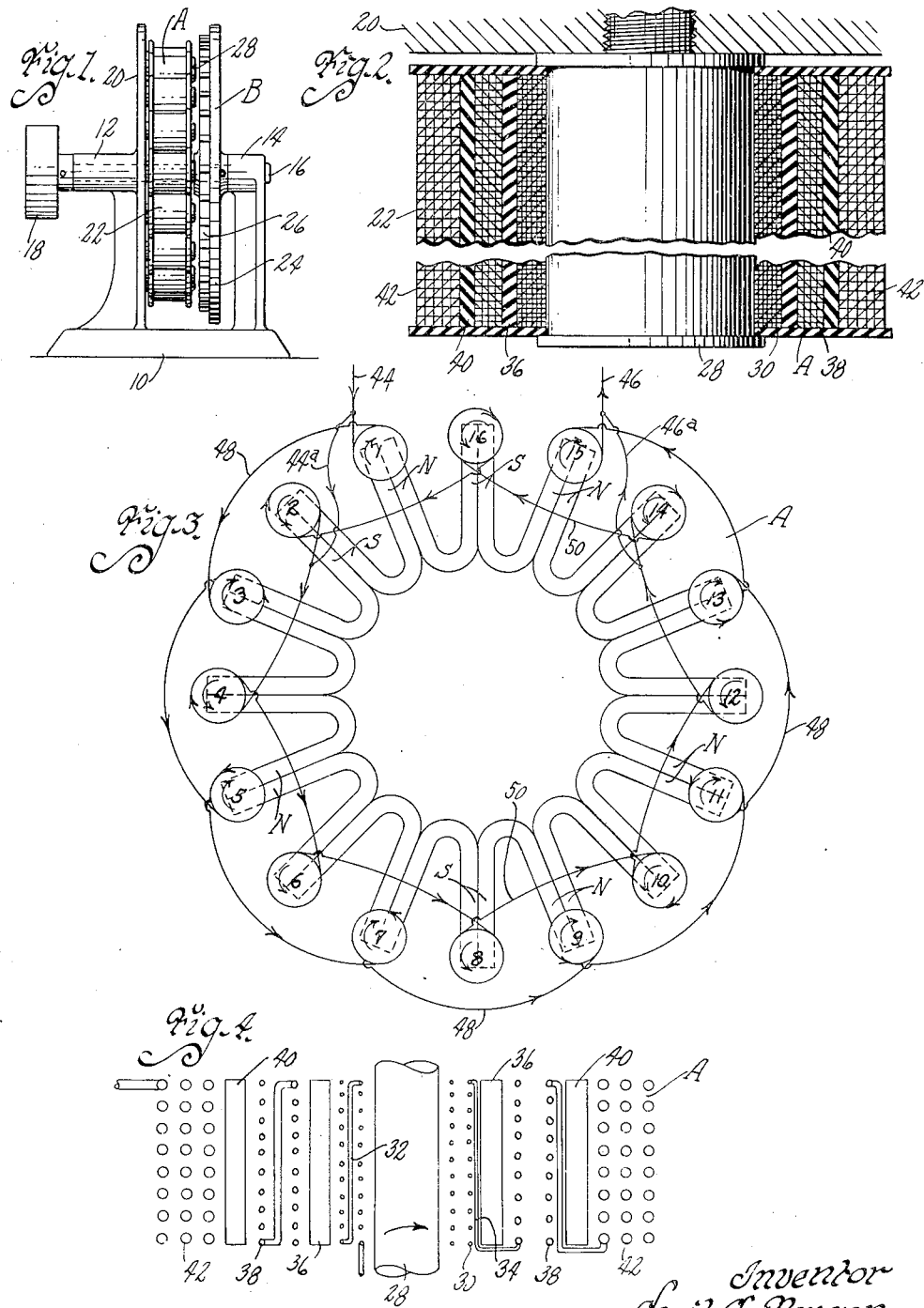
Inventor
Cecil C. Bergen
By Bair, Freeman & Sinclair
Attorneys
Witness
Edw. Seeley Patented Apr. 20, 1937

2,077,981

UNITED STATES PATENT OFFICE 2,077,981

GENERATOR STRUCTURE

Cecil C. Bergen, Marshalltown, Iowa, assignor of one-half to Ray P. Scott, Marshalltown, Iowa Application August 26, 1935, Serial No. 37,918

16 Claims. (Cl. 171—252)

The object of my invention is to provide a generator structure of simple, durable and inexpensive construction.

A further object is to provide a generator structure having windings so wound and arranged, and so connected together that maximum efficiency is secured, considerably more than the usual amount of current being secured per horse power of engine or motive power which rotates the rotor of the generator.

More particularly it is my object to provide a generator in which the generator windings comprise coils of a fine and heavy wire wound in a distinctive manner, which by experiment I have found produces proportionately greater efficiency than has been heretofore possible.

Still another object is to connect the windings of the generator in a manner which I have found by experiment produces greater efficiency than when connected in the ordinary manner.

With these and other objects in view my invention consists in the construction, arrangement and combination of the various parts of the device, whereby the objects contemplated are attained, as hereinafter more fully set forth, pointed out in my claims, and illustrated in the accompanying drawing, in which:

Figure 1 is a side elevation of a generator structure embodying my invention.

Figure 2 is a sectional view through one of the generating coils thereof, the view being shown on a greatly enlarged scale in comparison with Figure 1.

Figure 3 is a diagrammatical view showing the connections of various windings of the generator and the relation of the permanent magnet exciting elements relative thereto; and Figure 4 is a diagrammatical view of the coils wound on one of the windings of the generator.

Referring to the accompanying drawing I have used the numeral 10 to indicate a base. Bearings 12 and 14 are supported thereon for rotatively supporting a drive shaft 16. A belt pulley 18 is illustrated as being connected with the shaft 16 for the purpose of rotating the shaft from any suitable source of power.

My generator structure includes a stator A formed of a stationary disc 20 and a plurality of windings 22. A rotor B is provided in the form of a disc 24 having a plurality of permanent magnets 26 secured thereto to rotate therewith. The disc B is secured to the drive shaft 16.

The magnets 26 are preferably arranged as illustrated in Figure 3, with the north pole of one magnet adjacent the north pole of the next magnet, and the south pole of the first magnet adjacent the south pole of the magnet next to the first one on the other side. The poles are indicated at N and S in Figure 3. The described arrangement produces a plurality of circumferentially spaced and alternating north and south poles. Although I have illustrated permanent magnets, it is to be understood that electromagnets or other exciting magnets may be used for generating current in the windings 22 upon relative rotation between the members A and B.

Each winding 22 is similar, and I will now describe one of the windings in detail, as the construction thereof is quite important to the efficiency of my generator.

Each winding includes a core 28 having a first coil 30 wound thereon, formed of relatively small wire. The proportions of the core 28 are about seven-eighths of an inch in diameter and two inches long. I have experimented considerably to determine the proportions which I will set forth, and the sizes of the wires, etc. that I have found best for gaining maximum efficiency. For the coil 30 I have found No. 24 wire best for about 110 volts of generated current. About nine or ten layers of this wire are wound on the core 28 not in the usual back and forth manner, but from one end to the other thereof, and then back as at 32 to the starting end at the completion of each layer. At the completion of the last layer, the wire is again brought back as at 34.

A layer of insulation 36 is then provided over the first coil 30 and a second coil 38 is then wound in a similar manner and in the same direction. The coil 38 is of larger wire (about No. 19—five or six layers) and wound in the same manner as the first coil 30, coming back to the starting end of the core at the completion of each layer. Another layer of insulation 40 is then applied, this layer being about one-eighth of an inch thick. About nine or ten layers of No. 17 wire then are used to form the outer or third coil 42. This coil is wound in the reverse direction from the coils 30 and 38, and is formed of still larger wire and is wound in the ordinary manner—that is, back and forth from end to end of the core 28.

After a plurality of windings have been formed, I arrange them in a circle on the stationary disc 20, as shown diagrammatically in Figure 3, with the coils 30 and 38 of alternate windings wound in the same direction. The intermediate windings are formed in the opposite direction as shown by the arrow heads on the peripheries of the circles, numbered 1 to 16 in Figure 3 which represent the coils for the stator A. These indicate sixteen of the windings and small arrows within the circles indicate the opposite direction of current flow in the coils 42. Each winding is reversed with respect to its adjacent windings.

I have experimented with various connections and find those illustrated in Figure 3 as being most productive of high efficiency in the generator. It will be noted that alternate coils are connected in series, so that two groups are formed. One group (the windings having the odd numbers 1 to 15) has current supply wires 44 and 46 cut into its circuit, while the other group (the windings having even numbers 2 to 16) has a continuous circuit. The connecting wires of the first group are indicated at 48, and the connecting wires of the second group at 50. The current supply wires 44 and 46 have extensions 44a and 46a connected with two of the connecting wires 50 between the windings so as to straddle three of the windings of the second group or a total of five windings (specifically the connection between the windings 2 and 4 and between the windings 12 and 14).

I do not fully comprehend the reasons which underly the particular winding and connecting methods which I have found to produce great efficiency, but believe that the coils 30 build up voltage when the generator is in operation and the coils 38 build up the amperage so that both high voltage and high amperage can be produced. The coils 42 instead of serving any generating purpose, serve to choke or impede the current built up to a high value in the coils 30 and 38, and thereby regulate or govern the generating action so as to produce the desirable characteristic of substantially constant voltage and amperage at reasonable speeds of rotation of the generator.

Although I have given specific directions for the sizes and number of layers of coils which result in windings approximately two inches in diameter, these proportions can be varied to some extent, although I have found it important to wind the coils and connect them in the distinctive manner which I have set forth to produce a generator of maximum efficiency. I believe that mutual induction and self induction in the coils, due to their arrangement, produce the greater output of electricity per input of horse power than usual that I have experienced with the model which I have actually built and tested.

I have shown an elementary arrangement of windings and permanent magnets, although my principle can of course be applied to slotted armatures, and a commutator can be used in connection therewith for producing direct current in the ordinary manner instead of alternating current as is produced by the arrangement disclosed.

It is obvious also from the foregoing that numerous changes might be made in the construction, arrangement and operation of the parts, and it is my purpose to cover by my claims any modifications in structure or use of mechanical equivalents, which may reasonably come within the scope of my invention and of the claims.

I claim as my invention:

1. For a generator having a plurality of cores, a winding on each core, each winding comprising two coils wound in the same direction, one of said coils comprising relatively small wire and the other comprising relatively large wire, the layers of said two coils being wound only from one end toward the other end of the core, and a third coil wound thereon of still larger wire and wound back and forth on the core and in an opposite direction to the direction of winding of the first two coils, said coils on each core being all connected in series.

2. For a generator having a plurality of cores, a winding on each core, each winding comprising two coils, one of said coils comprising relatively small wire and the other comprising relatively large wire, the layers of said two coils being wound only from one end toward the other end of the core, and a third coil wound thereon of still larger wire and wound back and forth on the core and in an opposite direction to the direction of winding of the first two coils, said coils on each core being all connected in series.

3. For a generator having a plurality of cores, a winding on each core, each winding comprising two coils wound in the same direction, the layers of said two coils being wound only from the end toward the other end of the core, and a third coil wound thereon and wound back and forth on the core and in an opposite direction to the direction of winding of the first two coils, said coils on each core being all connected in series.

4. For a generator having a plurality of cores, a winding on each core, each winding comprising two coils, the layers of said two coils being wound only from one end toward the other end of the core, and a third coil wound thereon and wound back and forth on the core and in an opposite direction to the direction of winding of the first two coils, said coils on each core being all connected in series.

5. For a generator having a plurality of cores, a winding on each core, each winding comprising two coils wound in the same direction, one of said coils comprising relatively small wire and the other comprising relatively large wire, the layers of said two coils being wound only from one end toward the other end of the core, and a third coil wound thereon of still larger wire, and in an opposite direction to the direction of winding of the first two coils, said coils on each core being all connected in series.

6. For a generator having a plurality of cores, a winding on each core, each winding comprising two coils, one of said coils comprising relatively small wire and the other comprising relatively large wire, the layers of said two coils being wound only from one end toward the other end of the core, and a third coil wound thereon of still larger wire and in an opposite direction to the direction of winding of the first two coils, said coils on each core being all connected in series.

7. For a generator having a plurality of cores, a winding on each core, each winding comprising two coils wound in the same direction, one of said coils comprising relatively small wire and the other comprising relatively large wire, the layers of said two coils being wound only from one end toward the other end of the core, and a third coil wound thereon of still larger wire and wound back and forth on the core and in an opposite direction to the direction of winding of the first two coils.

8. For a generator having a plurality of cores, a winding on each core, each winding comprising two coils, the layers of said two coils being wound only from one end toward the other end of the core, and a third coil wound thereon and wound back and forth on the core and in an opposite direction to the direction of winding of the first two coils.

9. For a generator having a plurality of cores, a winding on each core, each winding comprising two coils wound in the same direction, one of said coils comprising relatively small wire and the other comprising relatively large wire, the layers of said two coils being wound only from one end toward the other end of the core, and a third coil wound thereon of still larger wire and wound back and forth on the core, said coils on each core being all connected in series.

10. For a generator having a plurality of cores, a winding on each core, each winding comprising two coils, one of said coils comprising relatively small wire and the other comprising relatively large wire, the layers of said two coils being wound only from one end toward the other end of the core, and a third coil wound thereon of still larger wire and wound back and forth on the core, said coils on each core being all connected in series.

11. For a generator having a plurality of cores, a winding on each core, each winding comprising two coils wound in the same direction, the layers of said two coils being wound only from one end toward the other end of the core, and a third coil wound thereon and wound back and forth on the core, said coils on each core being all connected in series.

12. For a generator having a plurality of cores, a winding on each core, each winding comprising two coils, one of said coils comprising relatively small wire and the other comprising relatively large wire, the layers of said two coils being wound only from one end toward the other end of the core, and a third coil wound thereon of still larger wire, said coils on each core being all connected in series.

13. For a generator having a plurality of cores, a winding on each core, each winding comprising two coils wound in the same direction, one of said coils comprising relatively small wire and the other comprising relatively large wire, the layers of said two coils being wound only from one end toward the other end of the core, and a third coil wound thereon of still larger wire and wound back and forth on the core and in an opposite direction to the direction of winding of the first two coils, said coils on each core being all connected in series, said windings being successively arranged in a circle about the axis of rotation and alternate ones thereof being connected in series with the exception of two alternate coils being connected instead with supply wires.

14. For a generator having a plurality of cores, a winding on each core, each winding comprising two coils wound in the same direction, one of said coils comprising relatively small wire and the other comprising relatively large wire, the layers of said coils being wound only from one end toward the other end of the core, and a third coil wound thereon of still larger wire and wound back and forth on the core and in an opposite direction to the direction of winding of the first two coils, said coils on each core being all connected in series, said windings being successively arranged in a circle about the axis of rotation and alternate ones thereof being connected in series with the exception of two alternate coils being connected instead with supply wires, and connections between said supply wires and the connections between the windings which alternate with said alternate ones thereof.

15. For a generator having a plurality of cores, a winding on each core, each winding comprising two coils, the layers of said two coils being wound only from one end toward the other end of the core, and a third coil wound thereon, said coils on each core being all connected in series, said windings being successively arranged in a circle about the axis of rotation and arranged in two alternate groups, the windings of each group being connected in series, and said current supply wires being cut into one group between two windings thereof.

16. For a generator having a plurality of cores, a winding on each core, each winding comprising two coils, the layers of said two coils being wound only from one end toward the other end of the core, and a third coil wound thereon, said coils on each core being all connected in series, said windings being successively arranged in a circle about the axis of rotation and arranged in two alternate groups, the windings of each group being connected in series, and said current supply wires being cut into one group between two windings thereof, said current supply wires being connected also with two connections between the windings of the other group so as to straddle three of the said windings of the other group.

CECIL C. BERGEN.